(No Model.)
V. R. OSTROM.
Sickle Bar for Harvesters.
No. 241,878. Patented May 24, 1881.
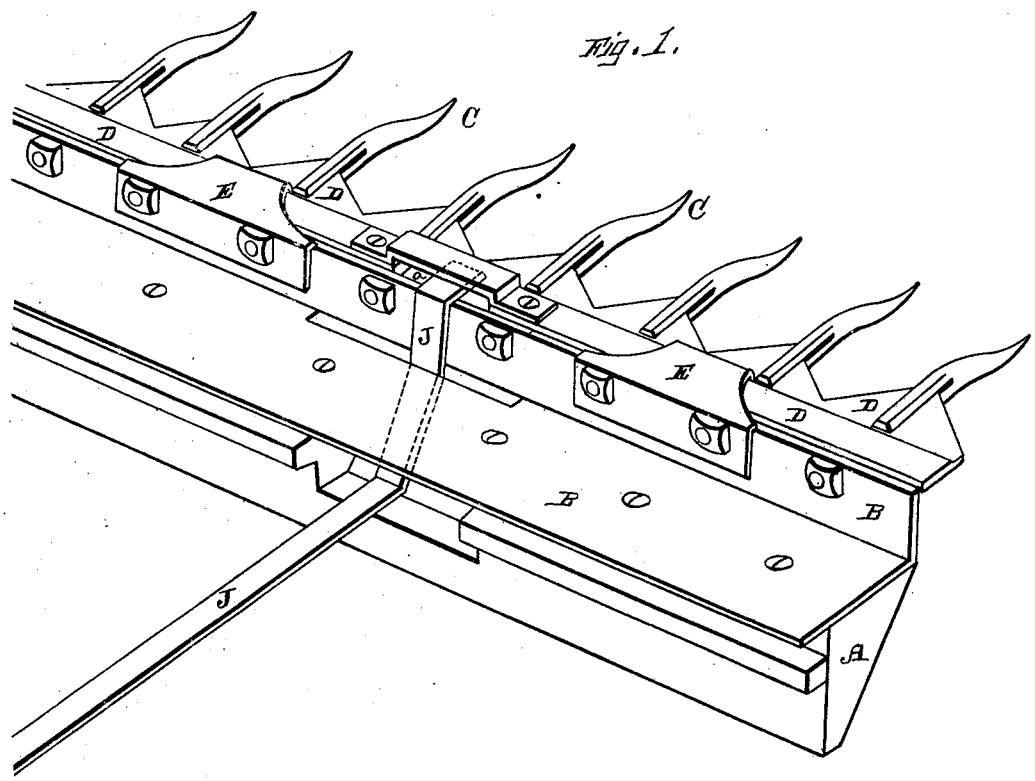
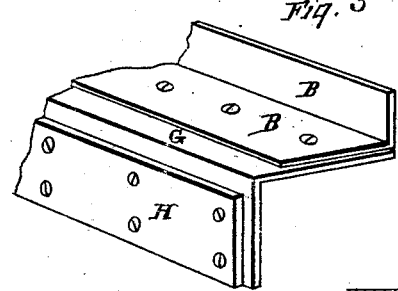
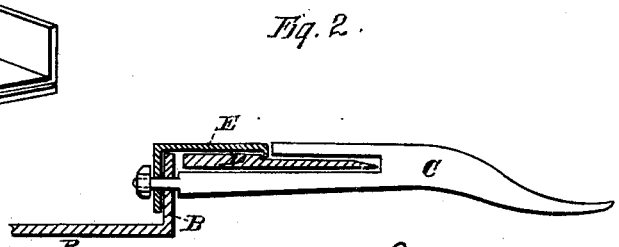
Witnesses,
Geo. H. Strong.
Frank A. Brooks
Inventor,
Vincent R. Ostrom
By Dewey & Co.
Attys.

UNITED STATES PATENT OFFICE.

VINCENT R. OSTROM, OF MODESTO, CALIFORNIA.

SICKLE-BAR FOR HARVESTERS.

SPECIFICATION forming part of Letters Patent No. 241,878, dated May 24, 1881.

Application filed March 5, 1881. (No model.)

*To all whom it may concern:*

Be it known that I, VINCENT R. OSTROM, of Modesto, county of Stanislaus, State of California, have invented an Improved Sickle-Bar for Harvesters; and I hereby declare the following to be a full, clear, and exact description thereof.

My invention relates to that class of agricultural implements known as "harvesters," and more especially to a peculiarly-constructed sickle-bar, the object of which is to prevent the grain from slipping and falling off when the front of the header is depressed at an angle to cut low grain.

It particularly relates to certain details of construction, the nature of which will hereinafter appear.

Referring to the accompanying drawings, Figure 1 is a view of my invention. Fig. 2 is a transverse section. Fig. 3 is another form of construction.

In operating headers, when the front is depressed to cut low grain the upper surface of the bar has a downward inclination, and there being no obstruction, the grain which fails to be caught by the traveling draper is liable to slip forward again onto the ground. A considerable portion of grain is thus lost. One of the objects of my invention is to prevent this loss.

Let A represent a wooden beam or bar extending horizontally across the front of the header-frame.

To the top of the bar A is secured the angle-iron stock B, its inclosing angle being toward the inside, as shown, and its vertical side extending upward from the forward edge of the beam A, above the level of the draper. It is secured to the beam in any proper manner by screws or bolts passing through the flange, which lies on the bar or beam. Thus a raised flange or wall is provided for the front of the harvester, which will prevent the grain from slipping forward over the front. This construction affords a novel and easy method of attaching the fingers.

Let C represent the fingers, of usual shape. They are secured to the vertical side of the angle-iron strap B either by screwing them in or by passing them through holes and securing their inner ends by nuts. Thus they are elevated sufficiently to work, and can be easily removed when for any purpose it is desired so to do.

D represents the sickle, of ordinary shape, sliding in front of the angle-iron strip at the top of its vertical side and in the slots in the fingers.

In order to prevent the sickle from getting out of place, I place the angled guides or clips E at intervals. The tops of these guides lie flat upon the sickle, and may be turned down a little in front to better hold it. They are secured to the inner side of the angle-iron strip B in any manner, as by passing the head of the fingers through them, and then securing with nuts, as shown here. It will be seen that the use of this angle-iron strip B, while accomplishing the purpose of saving the grain, which would otherwise slip forward and be lost, also permits an easy construction of other parts, giving a firm support and fastening to the fingers and guiding-clips.

I have thus far spoken of the application of my invention to harvesters now in use. In the construction of new harvesters I would dispense with the heavy beam A. Thus in Fig. 3 the angle-iron strip B is secured to a horizontal plate, G, which is turned downward and bolted to the narrow vertical beam H, which is itself secured to the front of the machine. The sickle and fingers are attached in the same way as I have described.

J represents the actuating lever or rod to operate the sickle. To avoid the draper it passes between its upper and lower sides, the beam A being cut away, as shown, to receive it. This recess in the beam A is only deep enough to carry the rod out of the way of the draper. The rod then turns upward and passes above the flat surface to the rear of the vertical side of the angle-iron strip B. A part of the strip is cut away to allow the rod to pass through and to give it sufficient side play. The sickle D has a recess, *a*, as shown, into which the end of the rod J penetrates, and by striking the ends of the recess *a* moves the sickle from side to side.

Having thus described my invention, what I claim as new, and desire to secure by Letters Patent, is—

In a harvester, a finger or sickle bar consisting of the angle-iron strip B, secured to the beam A, so as to have a vertical side raised above the level of the draper, whereby a wall is formed and the grain is prevented from slipping forward when the front of the header is depressed to cut low grain, substantially as described.

In witness whereof I have hereunto set my hand.

VINCENT R. OSTROM.

Witnesses:
FRANK A. BROOKS,
S. H. NOURSE.